United States Patent
Nagao (10) Patent No.: US 7,218,769 B2
(45) Date of Patent: May 15, 2007

(54) IMAGE DATA MANAGEMENT SYSTEM AND COMPUTER-READABLE RECORDING MEDIUM

(75) Inventor: Seiji Nagao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 782 days.

(21) Appl. No.: 10/660,796

(22) Filed: Sep. 12, 2003

(65) Prior Publication Data

US 2004/0083121 A1  Apr. 29, 2004

(30) Foreign Application Priority Data

Sep. 24, 2002 (JP) ............................. 2002-276457

(51) Int. Cl.
*G06K 9/00* (2006.01)

(52) U.S. Cl. .................. 382/141; 348/86; 348/125; 356/237.1

(58) Field of Classification Search ........ 382/141–152; 348/125–134, 86–112; 356/237.1–237.6; 705/4

See application file for complete search history.

(56) References Cited

U.S. PATENT DOCUMENTS

| 5,504,674 A | * | 4/1996 | Chen et al. | 705/4 |
| 6,177,287 B1 | * | 1/2001 | Steffan et al. | 438/14 |
| 2005/0222882 A1 | * | 10/2005 | Aoki et al. | 705/7 |

* cited by examiner

*Primary Examiner*—Bhavesh M Mehta
*Assistant Examiner*—Aaron Carter
(74) *Attorney, Agent, or Firm*—Morrison & Foerster LLP (57) ABSTRACT

A control unit of an image data management system receives image information and information regarding the image information, which are associated with each other, from an image photographing device via a communication unit, and stores the received information in a storage unit. The control unit receives an acquisition request for acquiring the image information and the information regarding the image information, which are associated with each other, from a terminal device via the communication unit, reads out the image information and the information regarding the image information, which are associated with each other and stored in the storage unit, in accordance with the acquisition request, and sends the read-out information to the terminal device which has sent the acquisition request via the communication unit.

6 Claims, 11 Drawing Sheets

DEVICE IDENTIFICATION INFORMATION : XXXXXXX

| COMPONENT NUMBER | QUANTITY | ATTACHMENT COMPONENT NUMBER | QUANTITY |
|---|---|---|---|
| AD013 | 2 | ZQ11 | 8 |
| CX45 | 1 | TA1 | 1 |
| SSA | 10 | TB5 | 5 |
| W200 | 4 | KG015 | 5 |
| ... | ... | ... | ... |

FIG. 4

| | DEVICE TYPE I | DEVICE TYPE II | DEVICE TYPE III | ... |
|---|---|---|---|---|
| DAMAGE/PROBLEM POINT A | 2 | 0 | 3 | ... |
| DAMAGE/PROBLEM POINT B | 0 | 2 | 1 | ... |
| DAMAGE/PROBLEM POINT C | 2 | 2 | 5 | ... |
| DAMAGE/PROBLEM POINT D | 4 | 1 | 5 | ... |
| ... | ... | ... | ... | ... |

FIG. 5

| DEVICE IDENTIFICATION INFORMATION : XXXXX ||
|:---:|:---:|
| ELEMENT A | 2 |
| ELEMENT B | 0 |
| ELEMENT C | 5 |
| ELEMENT D | 4 |
| ⋮ | ⋮ |

IMAGE DATA MANAGEMENT SYSTEM AND COMPUTER-READABLE RECORDING MEDIUM

BACKGROUND OF THE INVENTION

1. Field of the Invention

The present invention relates to an image data management system, etc. that enable speedy identification of a problem about product quality, and support technical analysis of the problem.

2. Description of the Related Art

Conventionally, in the analysis of a problem about product quality in the market, the condition of a damage of a product is notified from each store to the head office by phone calls or by mailing the damaged product, and researchers and analyzers in the head office analyze the problem technically.

However, it is difficult to understand the content of the problem through explanation of the condition of the damage by phone calls, and a long time is therefore required to identify the problem. Further, explanation of the condition of the damage by means of mailing the damaged product leaves the problem unanalyzed until the mailed product reaches the head office. Therefore, there has been a problem that a quick action to take care of the problem can not be taken.

SUMMARY OF THE INVENTION

The present invention was made in view of the above circumstances, and an object of the present invention is to provide an image data management system, etc. that can speedily identify the content of a problem about product quality that occurs in the market.

Another object of the present invention is to provide an image data management system, etc. that enable support for speedy technical analysis of a problem about product quality and for improving the problem source.

To achieve the above objects, an image data management system according to a first aspect of the present invention comprises: a communication unit for sending and receiving information between a terminal device and an image photographing device; a storage unit for storing information received by the communication unit; and a control unit for controlling the communication unit and the storage unit, wherein the control unit:

receives image information of a device having a damage and/or a problem and information regarding the image information, which are associated with each other, from the image photographing device;

stores the received image information and information regarding the image information, which are associated with each other, in the storage unit;

sends the image information and the information regarding the image information, which are associated with each other and stored in the storage unit, to an analysis-use terminal device for conducting an analysis on a damage and/or a problem of a device;

receives response information for responding to the sent image information and information regarding the image information from the analysis-use terminal device;

stores the received response information in the storage unit in association with the image information and the information regarding the image information, which correspond to the response information;

receives an acquisition request for acquiring the image information, the information regarding the image information, and the response information, which are associated with one another, from the terminal device;

reads out the image information, the information regarding the image information, and the response information, which are associated with one another and stored in the storage unit, in accordance with the received acquisition request; and sends the read-out image information, information regarding the image information, and response information, which are associated with one another, to the terminal device which has sent the acquisition request.

The control unit may generate component information indicating a component necessary for repairing the damage of the device and/or removing the problem of the device, based on the received response information, and may send the generated component information to an order receiver terminal device.

The control unit may generate the component information, in accordance with a generation request for the component information from the analysis-use terminal device.

The storage unit may store device type classification information for classifying devices by their device types, and the control unit may read out the device type classification information and the information regarding the image information, which are stored in the storage unit, and may store information on a damage point and/or a problem point which is included in the read-out information regarding the image information, in the storage unit device-type by device-type, based on the device type classification information.

The storage unit may store device structure classification information for classifying components of a device by elements of the device, and the control unit may read out the device structure classification information and the information regarding the image information, which are stored in the storage unit, and may store information on a damage point and/or a problem point which is included in the read-out information regarding the image information, in the storage unit element by element, based on the device structure classification information.

A recording medium according to a second aspect of the present invention stores a program for controlling a computer to perform:

a step of receiving image information of a device having a damage and/or a problem and information regarding the image information, which are associated with each other, from an image photographing device;

a step of storing the received image information and information regarding the image information, which are associated with each other, in a storage unit;

a step of sending the image information and the information regarding the image information, which are associated with each other and stored in the storage unit, to an analysis-use terminal device for conducting an analysis on a damage and/or a problem of a device;

a step of receiving response information for responding to the sent image information and information regarding the image information, from the analysis-use terminal device;

a step of storing the received response information in the storage unit, in association with the image information and the information regarding the image information, which correspond to the response information;

a step of receiving an acquisition request for acquiring the image information, the information regarding the image information, and the response information, which are associated with one another, from a terminal device;

a step of reading out the image information, the information regarding the image information, and the response information, which are associated with one another and stored in the storage unit, in accordance with the received acquisition request; and a step of sending the read-out image information, information regarding the image information, and response information, which are associated with one another, to the terminal device which has sent the acquisition request.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

An embodiment of the present invention will now be explained with reference to the drawings.

Figure 1:
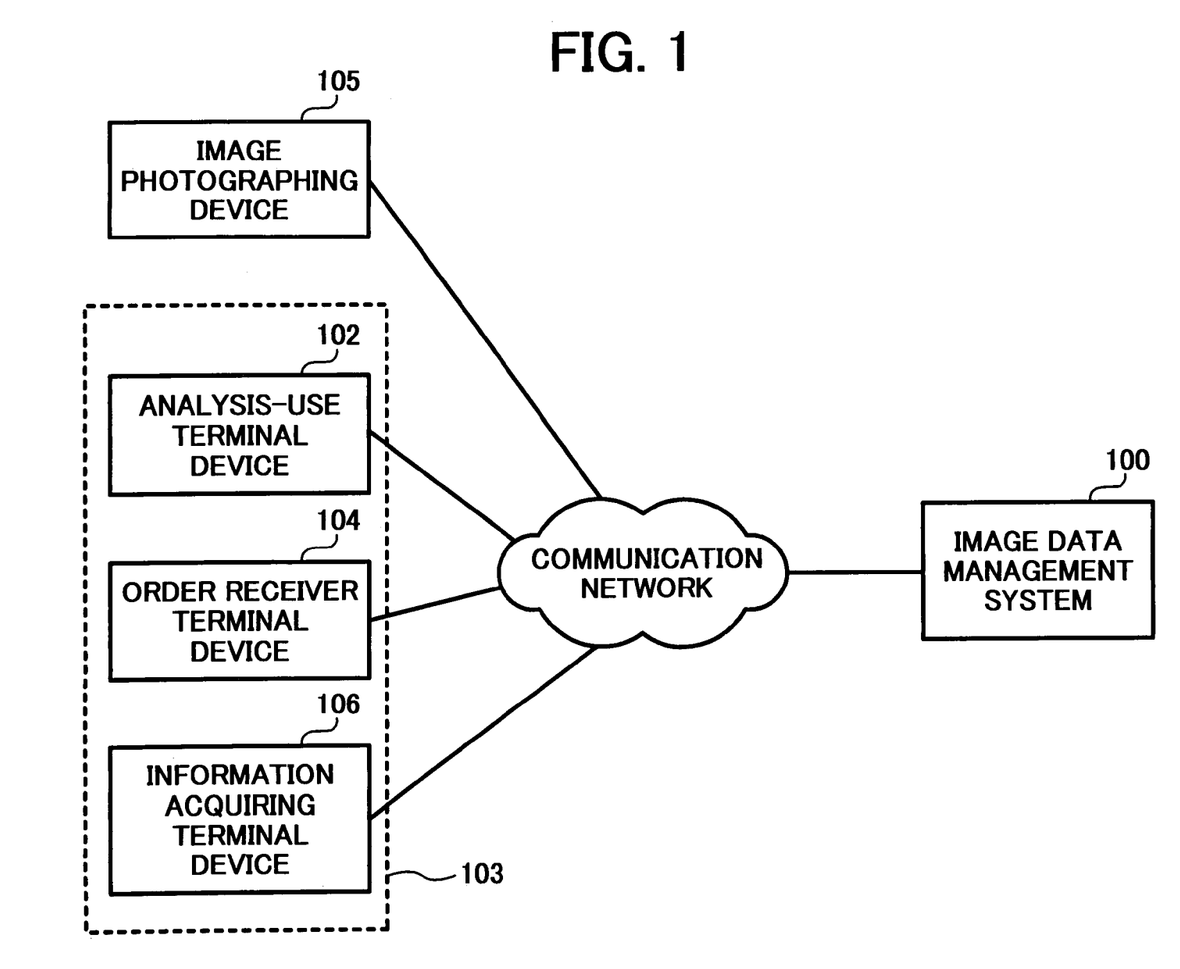
FIG. 1 is a concept diagram showing an example of a device information management system including an image data management system according to an embodiment of the present invention.

FIG. 1 is a concept diagram showing an example of a device information management system including an image data management system 100 according to an embodiment of the present invention. In this device information management system, the image data management system 100 is connected to various terminal devices 103, an image photographing device 105, etc. through a network. The terminal devices 103 include, for example, a terminal device (analysis-use terminal device) 102 installed at an analysis center, a terminal device (order receiver terminal device) 104 installed at an order receives who receives an order for a component of a device, and an information acquiring terminal device 106 for acquiring information from the image data management system 100. For example, in FIG. 1, the image data management system 100 is connected to an analysis-use terminal device 102, an order receiver terminal device 104, an information acquiring terminal device 106, and the image photographing device 105, through a communication network 101. The numbers of the respective terminal devices 103 (analysis-use terminal device 102, order receiver terminal device 104, information acquiring terminal device 106), and the image photographing device 105 may be one or more.

Figure 2:
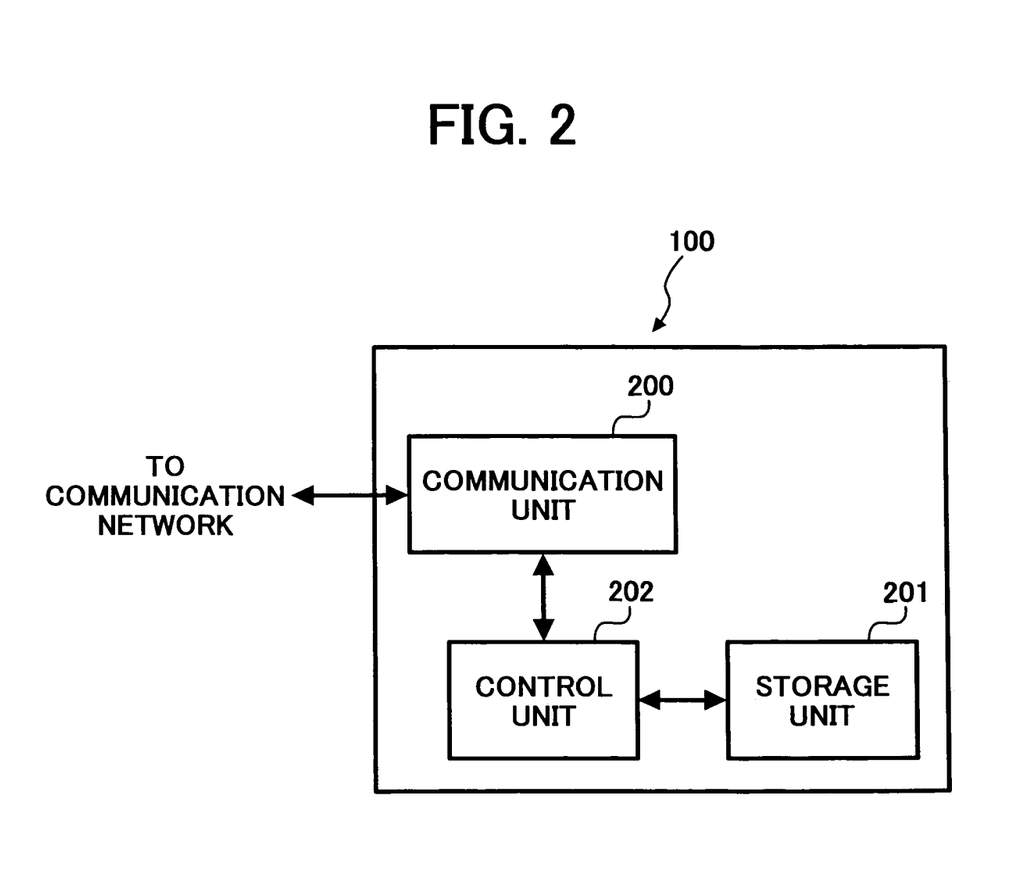
FIG. 2 is a block diagram showing an example of a structure of the image data management system.

FIG. 2 is a block diagram showing an example of the structure of the image data management system 100. As shown in FIG. 2, the image data management system 100 is constituted by a computer comprising a communication unit 200, a storage unit 201, and a control unit 202. The communication unit 200 controls communications with other devices through the communication network 101, and has a communication board, etc. The storage unit 201 includes, for example, a RAM (Random Access Memory), a ROM (Read Only Memory), a HDD (Hard Disk Drive), etc., and stores various programs executed by the control unit 202 and data necessary for various operations (such data including component information, device type classification information, device structure classification information, device-type-by-device-type damage/problem number information, element-by-element damage/problem number information, etc. which are to be described later). The control unit 202 comprises a CPU (Central Processing Unit), and performs various operations to be described later by reading and executing various programs stored in the storage unit 201.

Figure 3:
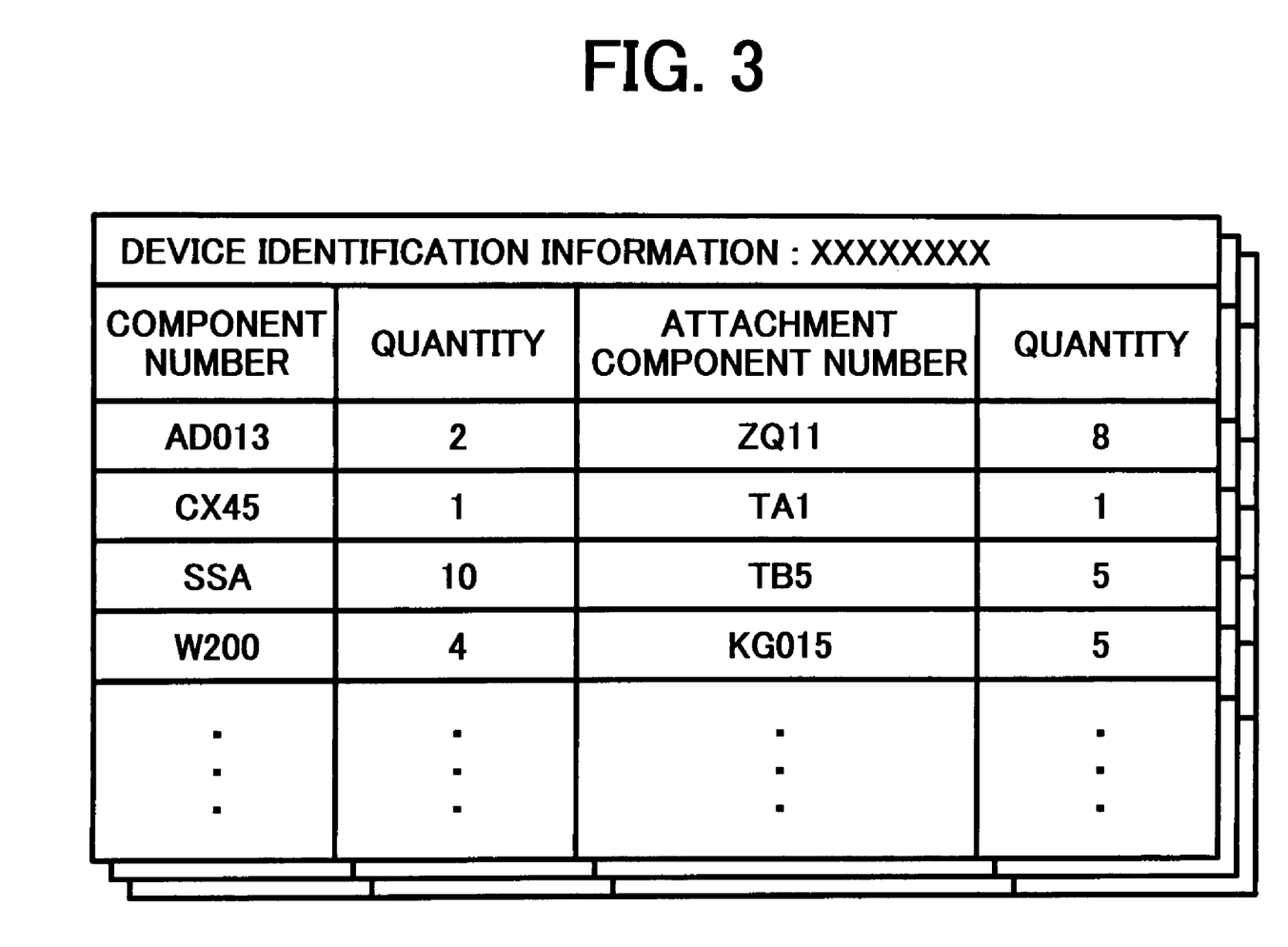
FIG. 3 is a diagram showing an example of a component information table.

FIG. 3 is a diagram showing an example of a table (component information table) indicating component information regarding devices that have damages and/or problems. As shown in FIG. 3, the component information includes device identification information of a device having a damage and/or a problem (defect), a number (component number) assigned to a component necessary for repairing the damage and/or removing the problem of the device and a required quantity of the component, a number (attachment component number) assigned to an attachment component relevant to the component and a required quantity of the attachment component, etc. The control unit 202 generates and updates the component information in the storage unit 201, based on predetermined information (response information to be described later) which is sent from the analysis-use terminal device 102 in a later-described component information sending operation.

Figure 4:
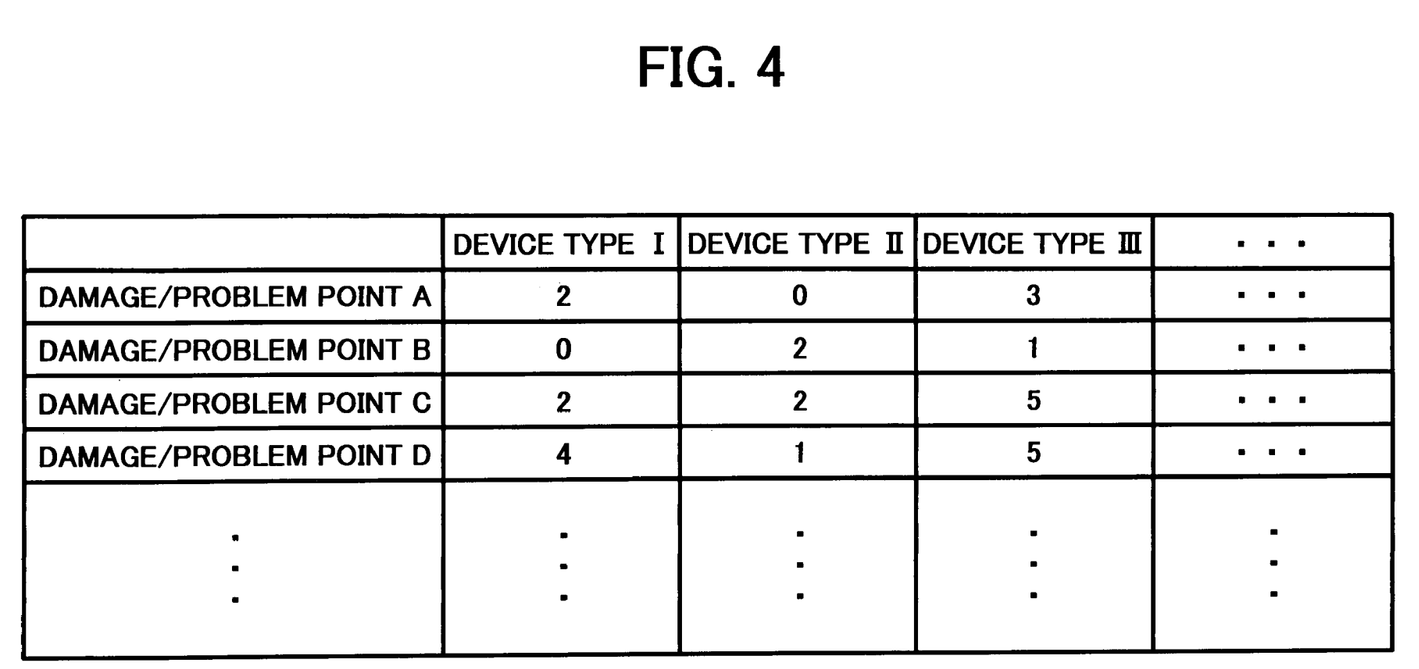
FIG. 4 is a diagram showing an example of a device-type-by-device-type damage/problem number information table.

FIG. 4 is a diagram showing an example of a device-type-by-device-type damage/problem number information table, which indicates a number of damages and/or problems point by point and device-type by device-type. Each value contained in this device-type-by-device-type damage/problem number information is obtained by classifying a device having a damage and/or problem into its corresponding device type based on device type classification information for classifying each device into any of a plurality of device types, and by counting up the number of damages and/or problems device-type by device-type, and damage-point by damage-point and/or problem-point by problem-point, based on the classification result. This device-type-by-device-type damage/problem number information makes it possible to know the number of damages and/or problems device-type by device-type and point by point. The device type classification information contains information for specifying devices which belong to each device type. The control unit 202 registers (stores) information on a damage point and/or problem point in the storage unit 201 device-type by device-type, based on the device type classification information stored in the storage unit 201 and based on information on a damage and/or problem of a device which is included in information regarding image information, in a later-described device-type-by-device-type damage/problem point registration operation. Specifically, the control unit 202 updates data in the device-type-by-device-type damage/problem number information table which is stored in the storage unit 201 and shown in FIG. 4.

Figure 5:
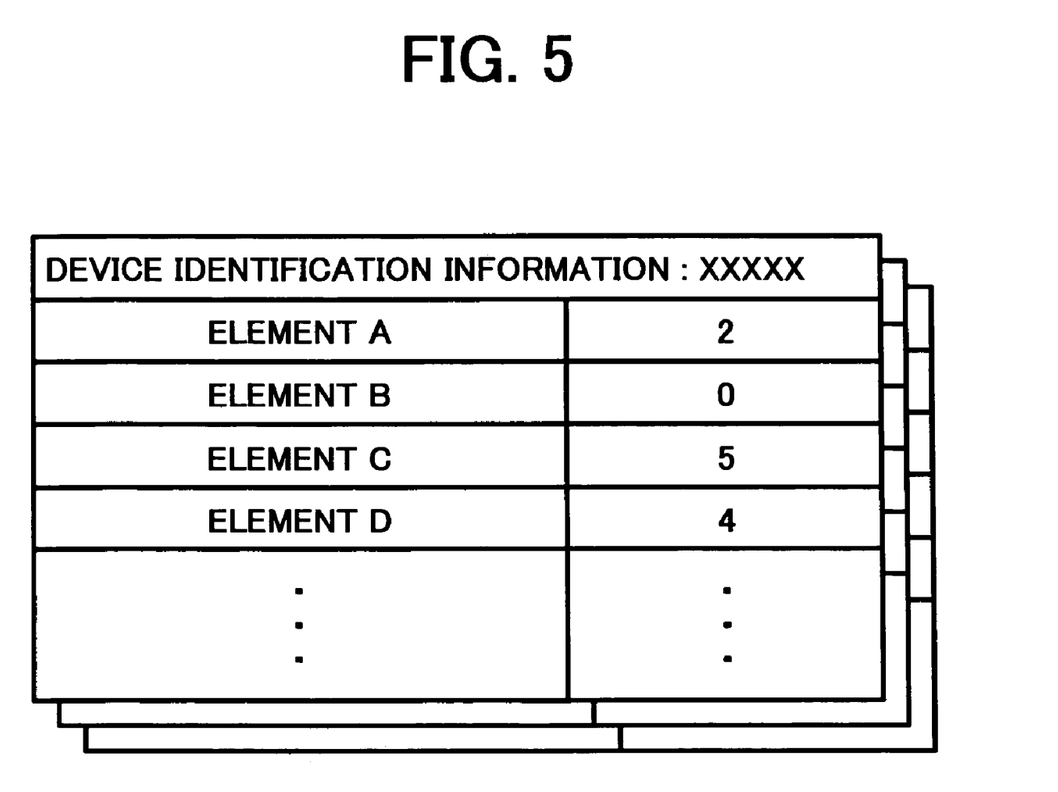
FIG. 5 is a diagram showing an example of an element-by-element damage/problem number information table.

FIG. 5 is a diagram showing an example of an element-by-element damage/problem number information table which indicates a number of damages and/or problems of each element of a device. Each value in this element-by-element damage/problem number information is obtained by counting up the number of damages and/or problems of a device element by element and device-identification-information by device-identification-information, based on device structure classification information for classifying a component of a device into any of a plurality of elements of the device. This element-by-element damage/problem number information makes it possible to know the number of damages and/or problems device by device and element by element. The device structure classification information contains information (component number, etc.) for specifying components which belong to each element of a device. The control unit 202 registers (stores) information on a damage point and/or problem point in the storage unit 201 element by element, based on the device structure classification information stored in the storage unit 201 and based on information on a damage and/or problem of a device which is included in information regarding image information, in a later-described element-by-element damage/problem point registration operation. Specifically, the control unit 202 updates data in the element-by-element damage/problem number information table which is stored in the storage unit 201 and shown in FIG. 5.

The image photographing device 105 is, for example, a digital camera having a communication function, a computer (comprising a control unit, a communication unit, a storage unit, an input unit, etc.) which is connected to a camera, or the like. The image photographing device 105 associates image information including a photographed image obtained by the camera with information regarding this image information, and sends them to the image data management system 100. The image information is a still image, a moving image, etc. The information regarding the image information is information on a device which is the subject in the image information, or information indicating the condition of a damage and/or problem of the device, and includes, for example; a manufacturing date and a manufacturing number of a device, a damage point and/or a problem point of the device, etc.

The analysis-use terminal device 102 is a terminal device which is installed in, for example, a place (head office, etc.) where a person (researcher, etc.) in charge of analyzing a problem about product quality belongs to. The analysis-use terminal device 102 is constituted by an ordinary computer comprising a control unit, an input unit, a display unit, a storage unit, a communication unit, etc. The control unit of the analysis-use terminal device 102 receives, via the communication unit, image information and information regarding the image information from the image data management system 100, stores the received information in the storage unit, and outputs the image information and the information regarding the image information in accordance with an input operation by the person in charge. The control unit of the analysis-use terminal device 102 sends response information, which is input by the person in charge for responding to the image information and the information regarding the image information, to the image data management system 100. The response information indicates, for example, a result of analyzing a problem about product quality, which is obtained by the person in charge.

The order receiver terminal device 104 is a terminal device installed at an order receiver who receives an order for a component which constitutes a product. The order receiver terminal device 104 is constituted by an ordinary computer comprising a control unit, an input unit, a display unit, a storage unit, a communication unit, etc. The control unit of the order receiver terminal device 104 receives, from the image data management system 100, component information which is generated based on response information, stores the received component information in the storage unit, and outputs the component information in accordance with an input operation by an operator.

The information acquiring terminal device 106 is constituted by an ordinary computer comprising, for example, a control unit, an input unit, a display unit, a storage unit, a communication unit, etc.

The terminal devices 103, including the analysis-use terminal device 102, the order receiver terminal device 104, and the information acquiring terminal device 106 have a function for acquiring image information, information regarding the image information, and response information, all of which are associated with one another, from the image data management system 100.

Next, an operation of the image data management system 100 according to the present embodiment will be explained with reference to FIG. 6 to FIG. 11. The image data management system 100, which reads a predetermined operation program, performs an image data management operation to be explained below.

Figure 6:
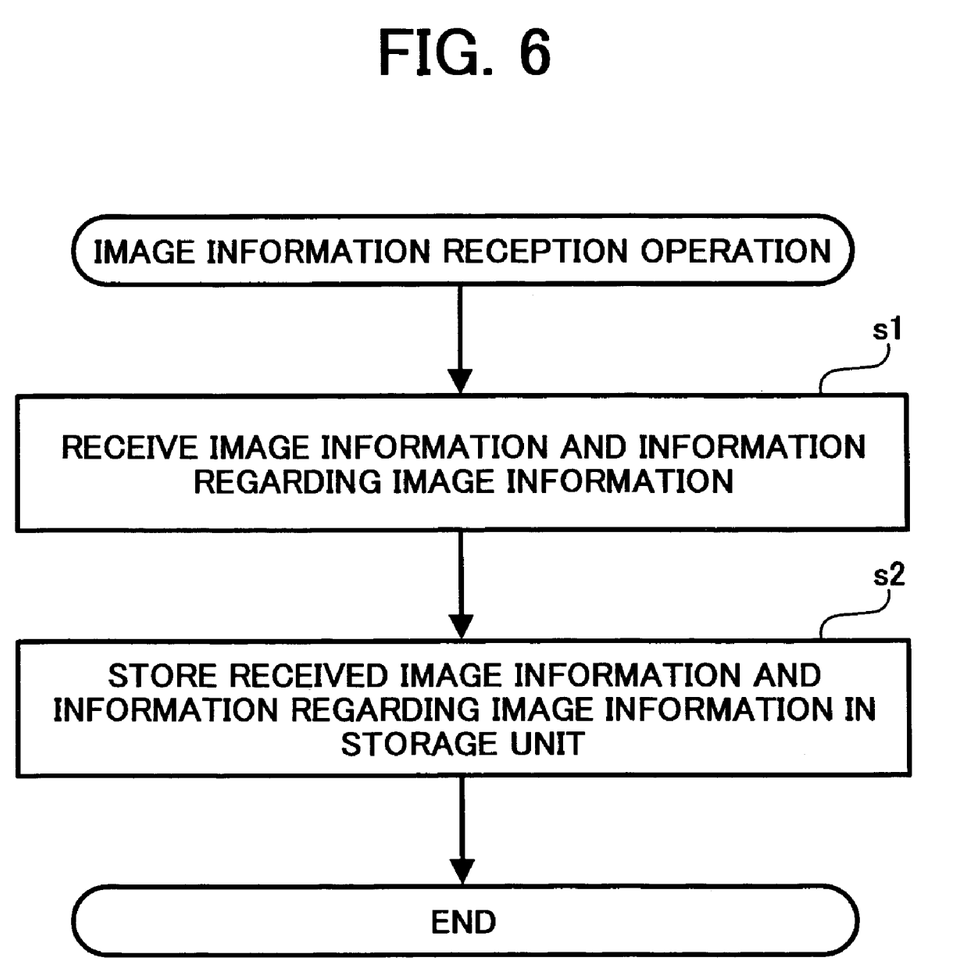
FIG. 6 is a flowchart for explaining an image information reception operation.

FIG. 6 shows an example of a flowchart for explaining an operation (image information reception operation) performed by the image data management system 100 to receive image information and information regarding the image information from the image photographing device 105.

In a case where, for example, a damage and/or problem is found in a product, the image photographing device 105 associates image information of this product with information regarding the image information, and sends them to the image data management system 100, in accordance with a predetermined operation.

The control unit 202 of the image data management system 100 receives the image information and the information regarding the image information which are associated with each other, from the image photographing device 105 via the communication device 200 (step s1). Next, the control unit 202 stores the received associated image information and information regarding the image information in the storage unit 201 (step s2), and finishes this operation.

Figure 7:
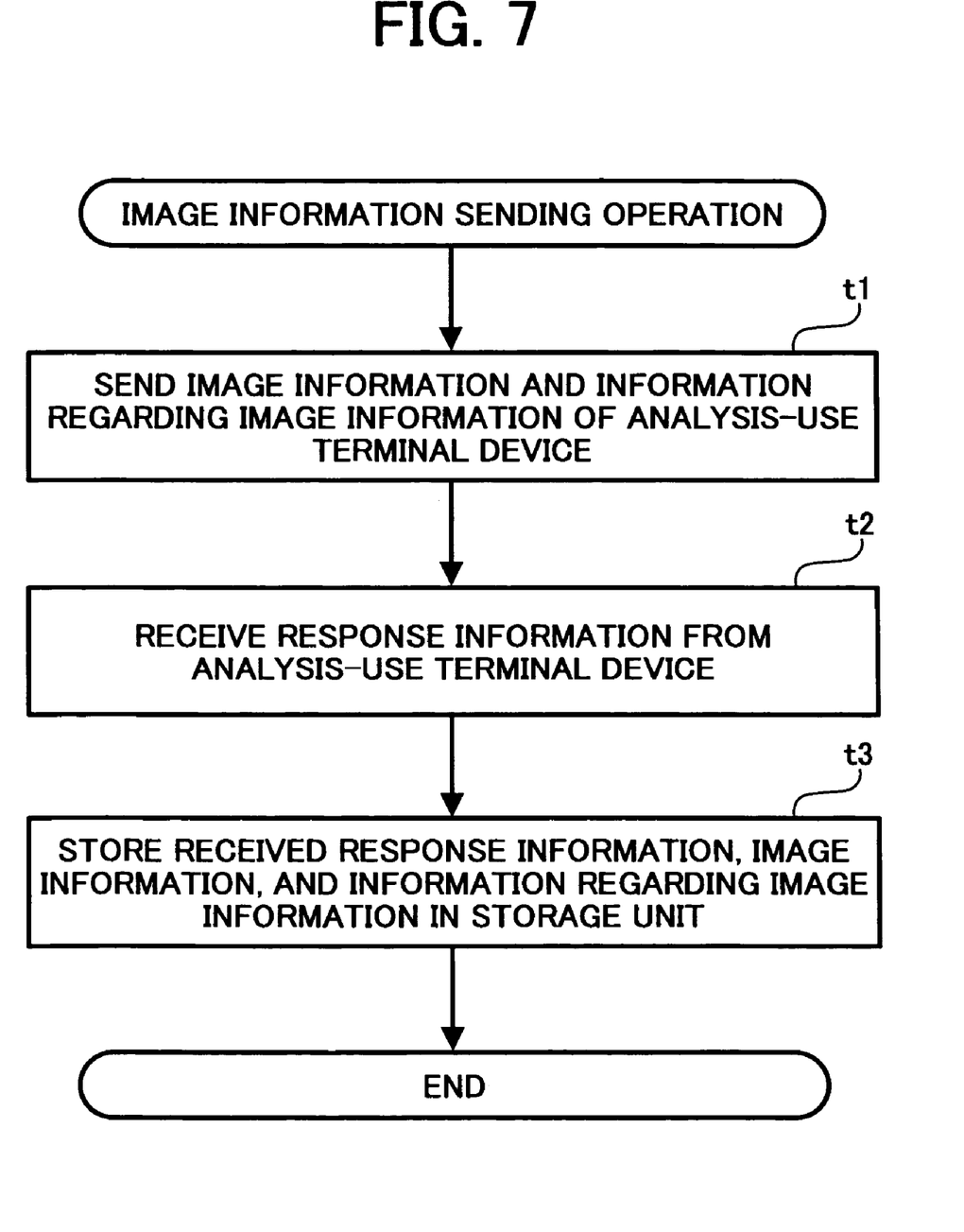
FIG. 7 is a flowchart for explaining an image information sending operation.

FIG. 7 is a diagram showing an example of a flowchart for explaining an operation (image information sending operation) performed by the image data management system 100 to send the image information and the information regarding the image information which are stored in the storage unit 201 to the analysis-use terminal device 102.

The control unit 202 of the image data management system 100 reads out the image information and the information regarding the image information which are associated with each other from the storage unit 201, and sends them to the analysis-use terminal device 102 (step t1). On the side where the analysis-use terminal device 102 is installed, an analysis by a researcher based on the received image information and information regarding the image information is conducted, and an analysis result is sent from the analysis-use terminal device 102 to the image data management system 100. The control unit 202 of the image data management system 100 receives, from the analysis-use terminal device 102, response information indicating a response to the information sent in step t1 (step t2). Next, the control unit 202 associates the response received in step t2 with the image information and the information regarding the image information, stores them in the storage unit 201 (step t3), and finishes this operation.

Figure 8:
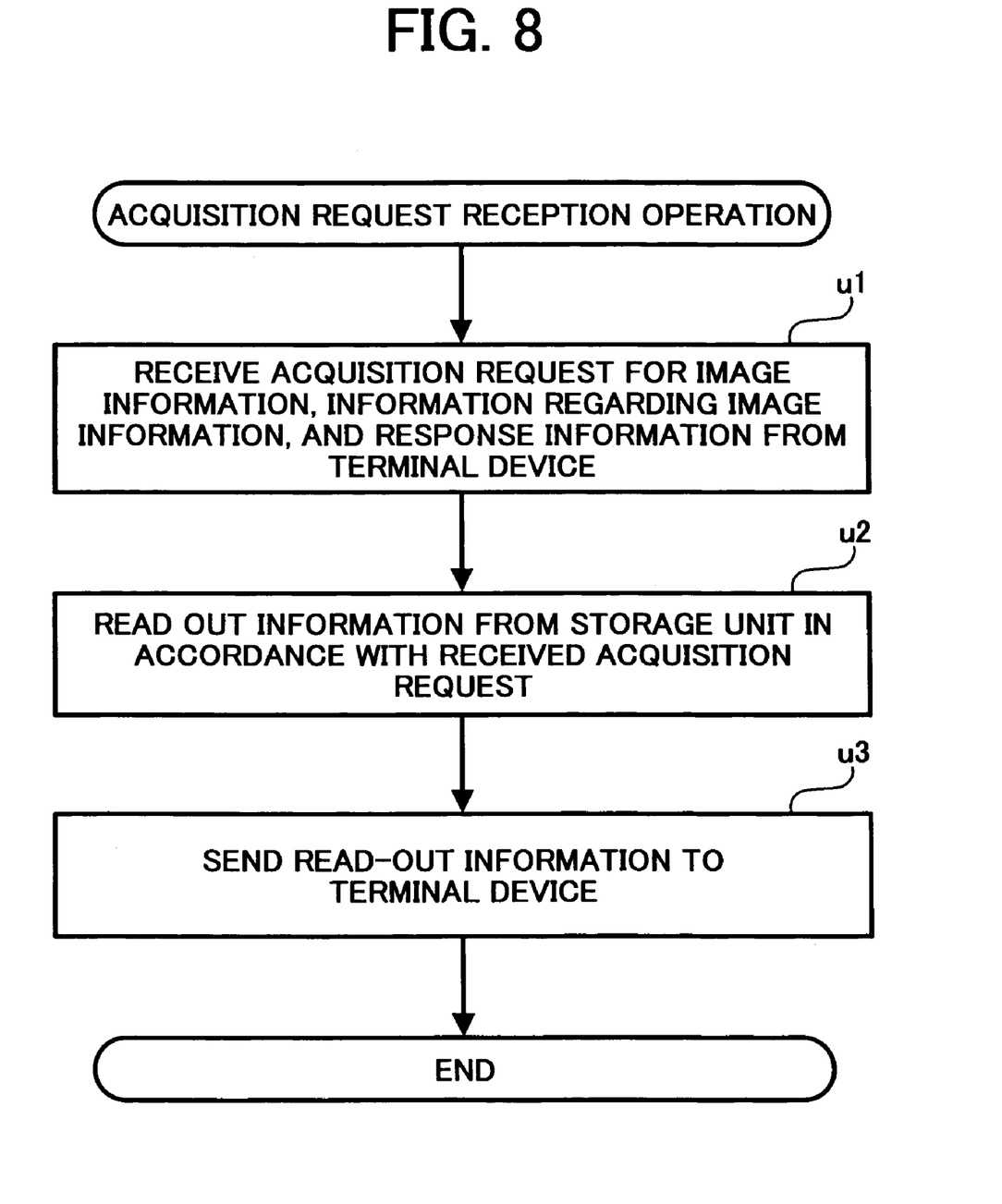
FIG. 8 is a flowchart for explaining an acquisition request reception operation.

FIG. 8 is a diagram showing an example of a flowchart for explaining an operation (acquisition request reception operation) performed by the image data management system 100 when the image data management system 100 receives, from the terminal devices 103, etc. an acquisition request for acquiring the image information, the information regarding the image information, and the response information associated with them.

The control unit 202 of the image data management system 100 receives, from a terminal device 103 such as the analysis-use terminal device 102, the order receiver terminal device 104, and the information acquiring terminal device 106, an acquisition request for acquiring the image information, the information regarding the image information, and the response information, all of which are associated with one another (step u1). Next, the control unit 202 reads out the associated image information, information regarding the image information, and response information from the storage unit 201, in accordance with the received acquisition request (step u2). The control unit 202 sends the information read out in step u2 to the terminal device (the analysis-use terminal device 102, the order receiver terminal device 104, or the information acquiring terminal device 106) which has sent the acquisition request (step u3), and finishes this operation.

Figure 9:
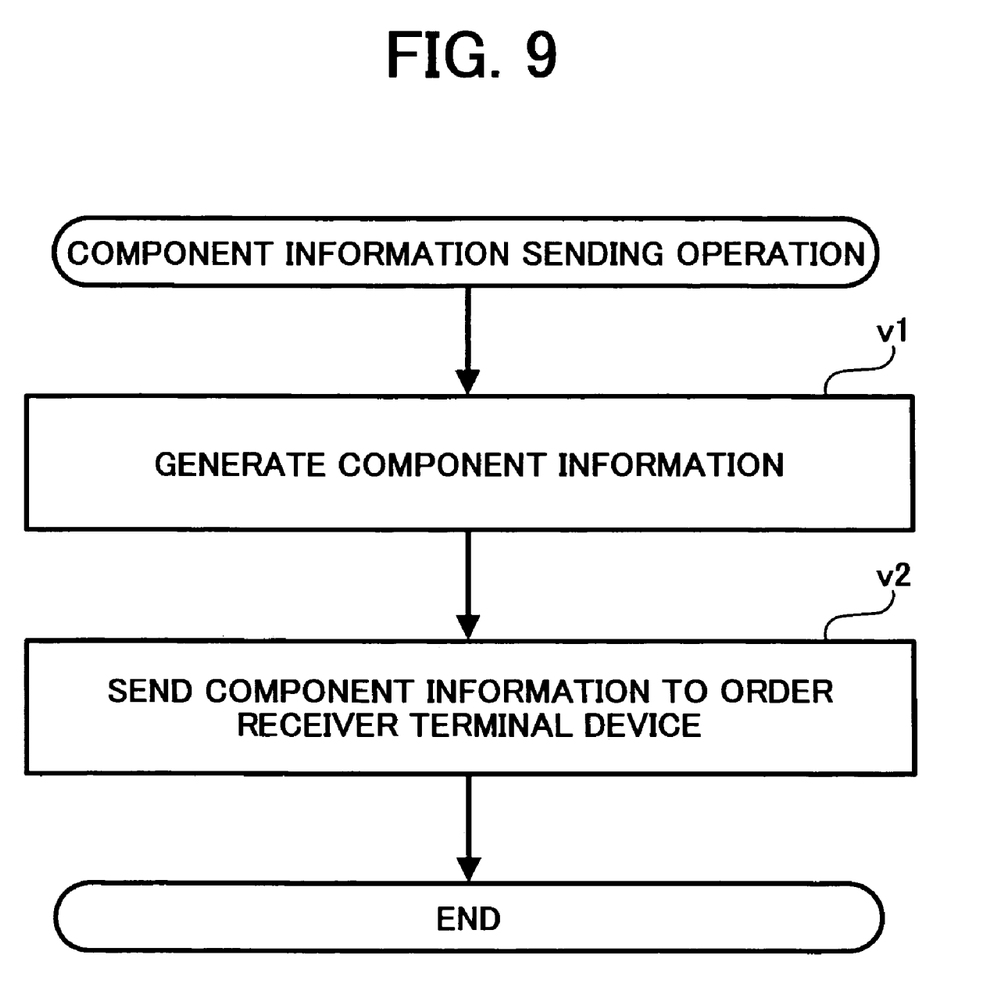
FIG. 9 is a flowchart for explaining a component information sending operation.

FIG. 9 is a diagram showing an example of a flowchart for explaining an operation (component information sending operation) performed by the image data management system 100 to generate component information and send it to the order receiver terminal device 104.

The control unit 202 of the image data management system 100 generates component information (see FIG. 3), based on the response information sent from the analysis-use terminal device 102 in the image information sending operation (step v1). Specifically, the control unit 202 extracts data necessary for generating the component information from the response information, and may generate the component information by using the extracted data. Next, the control unit 202 sends the generated component information to the order receiver terminal device 104 (step v2), and finishes this operation. The present operation may be performed in response to a generation request from the analysis-use terminal device 102 for requesting generation of the component information.

Figure 10:
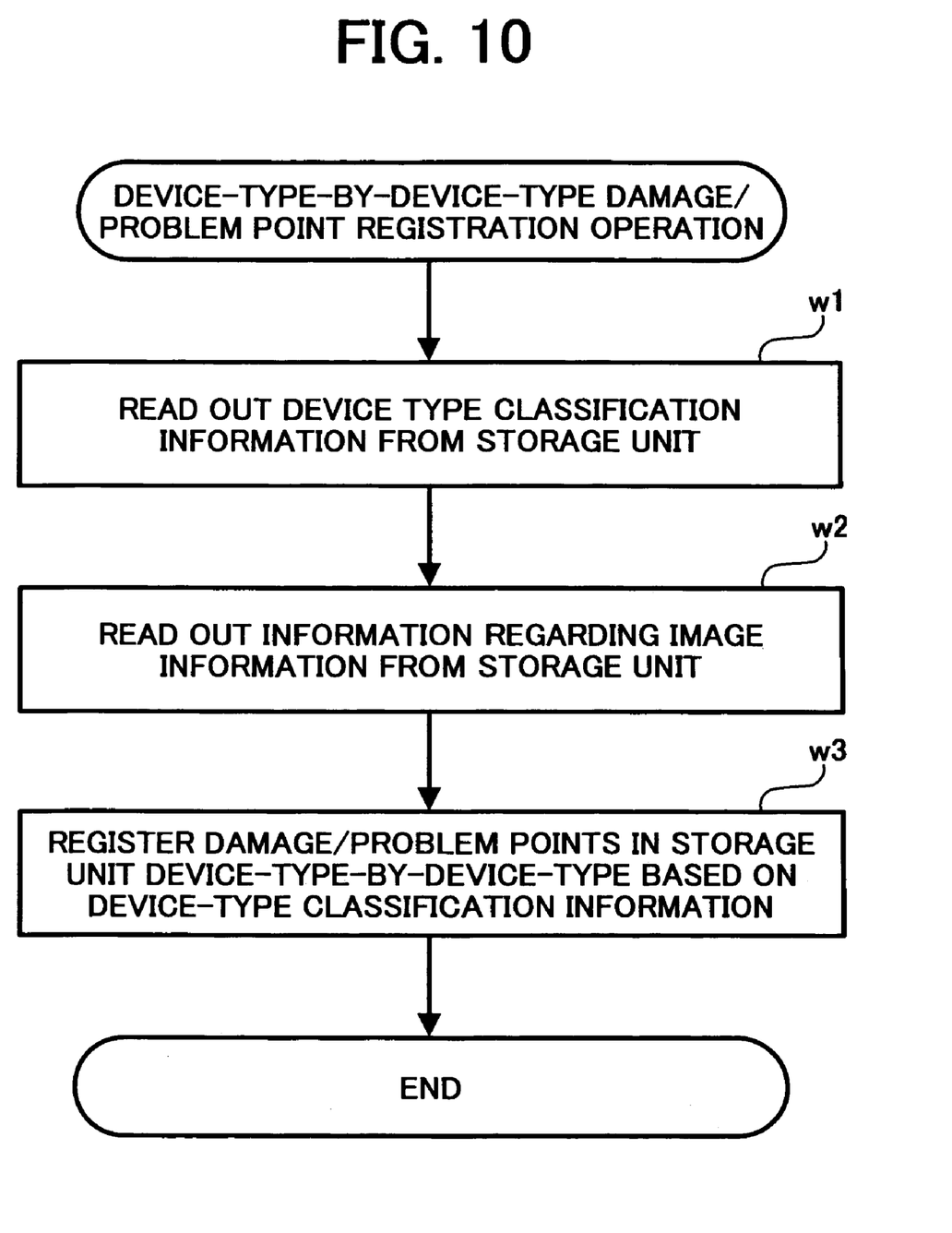
FIG. 10 is a flowchart for explaining a device-type-by-device-type damage/problem point registration operation.

FIG. 10 is a diagram showing an example of a flowchart for explaining an operation (device-type-by-device-type damage/problem point registration operation) performed by the image data management system 100 to register information on device-type-by-device-type damage points and/or problem points, based on information on damage points and/or problem points which is included in the information regarding the image information, by referring to the device type classification information.

First, the control unit 202 of the image data management system 100 reads out the device type classification information stored in the storage unit 201 (step w1). Next, the control unit 202 reads out the information regarding the image information which is stored in the storage unit 201 (step w2). Then, the control unit 202 registers (stores) information on damage points and/or problem points which is included in the read-out information regarding the image information, in the storage unit 201 device-type by device-type, based on the device type classification information (step w3), and finishes this operation.

Figure 11:
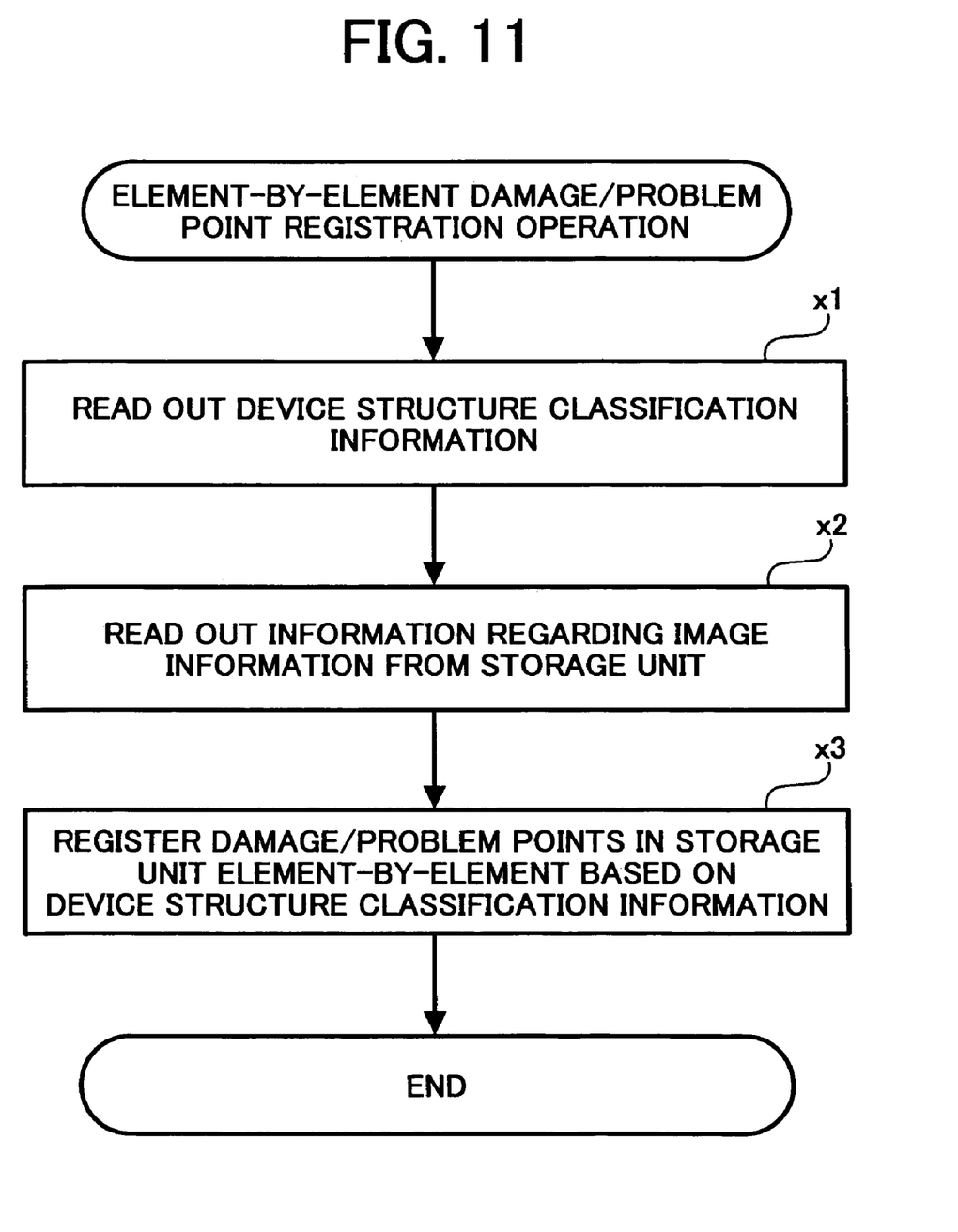
FIG. 11 is a flowchart for explaining an element-by-element damage/problem point registration operation.

FIG. 11 is a diagram showing an example of a flowchart for explaining an operation (element-by-element damage/problem point registration operation) performed by the image data management system 100, to update element-by-element damage/problem number information, based on information on damage points and/or problem points which is included in the information regarding the image information, by referring to the device structure classification information.

First, the control unit 202 of the image data management system 100 reads out the device structure classification information stored in the storage unit 201 (step x1). Next, the control unit 202 reads out the information regarding the image information from the storage unit 201 (step x2). Then, the control unit 202 registers (stores) information on damage points and/or problem points which is included in the read-out information regarding the image information, in the storage unit 201 element by element, based on the device structure classification information (step x3), and finishes this operation.

As described above, the present embodiment makes it possible for researchers and analyzers to identify real time the content of a problem about product quality that occurs in the market, and thus enables speedy technical analysis and support for improving the problem source. Further, the control unit 202 can immediately send an order for components necessary for repair, by generating component information regarding components necessary for repairing damages of a device and/or removing problems of a device based on the response information, and sending the generated component information to the order receiver terminal device 104, etc.

The control unit 202 reads out the device type classification information stored in the storage unit 201, reads out information regarding image information stored in the storage unit 201, and stores values representing numbers of damages and/or problems in the storage unit 201 device-type by device-type, based on damage points and/or problem points indicated by the information regarding image information, and based on the device type classification information. This makes it possible to grasp the frequency of damages and/or problems of a product, and the next-time product development can be carried out with such data taken into consideration.

The present invention is not limited to the above-described embodiment. For example, the control unit 202 may perform the operation for generating the component information, and at the same time, may perform an operation for generating a bill of costs required for ordering components.

Because the present invention is structured and functions as described above, the present invention can enable real-time identification of the content of a problem about product quality occurring in the market, and enable speedy technical analysis and support for improving the problem source.

In the present embodiment, the term "device" represents an image forming device such as a copier, a facsimile machine, a printer, etc. However, the "device" is not limited to these devices, but may be other devices made up of components, such as an automatic four-wheeled vehicle, a motorcycle, etc.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2002-276457 filed on Sep. 24, 2002 and including specification, claims, drawings and summary. The disclosure of the above Japanese Patent Application is incorporated herein by reference in its entirety.

What is claimed is:

1. An image data management system comprising: a communication unit for sending and receiving information between a terminal device and an image photographing device; a storage unit for storing information received by said communication unit; and a control unit for controlling said communication unit and said storage unit, wherein said control unit:

receives image information of a device having a damage and/or a problem and information regarding the image information, which are associated with each other, from said image photographing device;

stores the received image information and information regarding the image information, which are associated with each other, in said storage unit;

sends the image information and the information regarding the image information, which are associated with each other and stored in said storage unit, to an analysis-use terminal device for conducting an analysis on a damage and/or a problem of a device;

receives response information for responding to the sent image information and information regarding the image information from said analysis-use terminal device;

stores the received response information in said storage unit in association with the image information and the information regarding the image information, which correspond to the response information;

receives an acquisition request for acquiring the image information, the information regarding the image information, and the response information, which are associated with one another, from said terminal device;

reads out the image information, the information regarding the image information, and the response information, which are associated with one another and stored in said storage unit, in accordance with the received acquisition request; and sends the read-out image information, information regarding the image information, and response information, which are associated with one another, to said terminal device which has sent the acquisition request.

2. The image data management system according to claim 1, wherein said control unit:

generates component information indicating a component necessary for repairing the damage of the device and/or removing the problem of the device, based on the received response information; and sends the generated component information to an order receiver terminal device.

3. The image data management system according to claim 2, wherein said control unit generates the component information, in accordance with a generation request for the component information from said analysis-use terminal device.

4. The image data management system according to claim 1, wherein:

said storage unit stores device type classification information for classifying .devices by their device types; and said control unit reads out the device type classification information and the information regarding the image information, which are stored in said storage unit, and stores information on a damage point and/or a problem point which is included in the read-out information regarding the image information, in said storage unit device-type by device-type, based on the device type classification information.

5. The image data management system according to claim 1, wherein:

said storage unit stores device structure classification information for classifying components of a device by elements of the device; and said control unit reads out the device structure classification information and the information regarding the image information, which are stored in said storage unit, and stores information on a damage point and/or a problem point which is included in the read-out information regarding the image information, in said storage unit element by element, based on the device structure classification information.

6. A computer-readable recording medium storing a program for controlling a computer to perform:

a step of receiving image information of a device having a damage and/or a problem and information regarding the image information, which are associated with each other, from an image photographing device;

a step of storing the received image information and information regarding the image information, which are associated with each other, in a storage unit;

a step of sending the image information and the information regarding the image information, which are associated with each other and stored in said storage unit, to an analysis-use terminal device for conducting an analysis on a damage and/or a problem of a device;

a step of receiving response information for responding to the sent image information and information regarding the image information, from said analysis-use terminal device;

a step of storing the received response information in said storage unit, in association with the image information and the information regarding the image information, which correspond to the response information;

a step of receiving an acquisition request for acquiring the image information, the information regarding the image information, and the response information, which are associated with one another, from a terminal device;

a step of reading out the image information, the information regarding the image information, and the response information, which are associated with one another and stored in said storage unit, in accordance with the received acquisition request; and a step of sending the read-out image information, information regarding the image information, and response information, which are associated with one another, to said terminal device which has sent the acquisition request.

* * * * *